United States Patent
Lee et al.

(10) Patent No.: US 10,333,120 B2
(45) Date of Patent: Jun. 25, 2019

(54) CYLINDRICAL SECONDARY BATTERY WITH REDUCED CIRCUMFERENTIAL SURFACE RUPTURE

(71) Applicant: Samsung SDI Co., Ltd., Yongin-si, Gyeonggi-do (KR)

(72) Inventors: Sanghyo Lee, Yongin-si (KR); Wonil Jung, Yongin-si (KR); Sunhyung Kim, Yongin-si (KR); Mirae Im, Yongin-si (KR); Minsic Kim, Yongin-si (KR); Gyeonghwan Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 72 days.

(21) Appl. No.: 15/453,463

(22) Filed: Mar. 8, 2017

(65) Prior Publication Data

US 2017/0301899 A1 Oct. 19, 2017

(30) Foreign Application Priority Data

Apr. 14, 2016 (KR) .................. 10-2016-0045539

(51) Int. Cl.
*H01M 2/02* (2006.01)
*H01M 2/04* (2006.01)
*H01M 2/12* (2006.01)

(52) U.S. Cl.
CPC ......... *H01M 2/1235* (2013.01); *H01M 2/022* (2013.01); *H01M 2/046* (2013.01); *H01M 2200/20* (2013.01)

(58) Field of Classification Search
CPC ..... H01M 2/022; H01M 2/046; H01M 2/1235
USPC ................................. 429/164, 174
See application file for complete search history.

(56) References Cited

U.S. PATENT DOCUMENTS

| 2010/0119935 A1* | 5/2010 | Kim | H01M 2/0413 429/164 |
| 2011/0223472 A1* | 9/2011 | Ikeda | H01M 2/0225 429/174 |

FOREIGN PATENT DOCUMENTS

| KR | 2001-0048268 | 6/2001 |
| KR | 10-2008-0034221 | 4/2008 |
| KR | 20080034221 A * | 4/2008 |
| KR | 20130063206 A * | 6/2013 |
| KR | 20140005653 A * | 1/2014 |
| KR | 10-2016-0011983 | 2/2016 |

OTHER PUBLICATIONS

Lee Je Jun, Machine Translation of KR-20130063206-A, Jun. 2013 (Year: 2013).*

* cited by examiner

*Primary Examiner* — Sean P Cullen
(74) *Attorney, Agent, or Firm* — Lewis Roca Rothgerber Christie LLP

(57) ABSTRACT

A secondary battery includes: a cylindrical can including a first region, a second region, and a first bent portion extending between the first region and the second region on a circumferential surface of the can; an electrode assembly accommodated in the can; and a cap assembly at a top end of the can and sealing the can. The first bent portion is bent such that an angle between the first region and the second region is in a range of about 90° to about 100°; the first region of the can partially covers a top surface of the cap assembly facing an exterior side of the can, and the second region of the can surrounds side surfaces of the cap assembly.

8 Claims, 3 Drawing Sheets

CYLINDRICAL SECONDARY BATTERY WITH REDUCED CIRCUMFERENTIAL SURFACE RUPTURE

CROSS-REFERENCE TO RELATED APPLICATION

This application claims priority to and the benefit of Korean Patent Application No. 10-2016-0045539, filed on 14 Apr. 2016 in the Korean Intellectual Property Office, and all the benefits accruing therefrom under 35 U.S.C. § 119, the content of which is herein incorporated by reference in its entirety.

BACKGROUND

1. Field

Embodiments of the present invention relate to a secondary battery.

2. Description of the Related Art

A secondary battery is a battery that converts chemical energy into electrical energy to supply power to an external circuit and converts electrical energy into chemical energy when it is supplied with external power to store electricity that can be later discharged. The secondary battery is widely used for a variety of electric devices and/or electric vehicles. The secondary battery may be classified as a cylindrical battery, a prismatic battery, or a pouch type battery according to the external shape and/or construction thereof. Among other features, the cylindrical battery has a relatively large capacity and good structural stability.

The above information disclosed in this Background section is for enhancement of understanding of the background of the described technology, and therefore, it may contain information that does not form prior art.

SUMMARY

Embodiments of the present invention provide a secondary battery in which a circumferential surface of a can will not rupture, or will have a reduced risk of a rupture, due to internal gas generated by the secondary battery.

The above and other aspects of the present invention will be described in or will be apparent from the following description of exemplary embodiments thereof.

According to an embodiment of the present invention, a secondary battery includes: a cylindrical can including a first region, a second region, and a first bent portion extending between the first region and the second region on a circumferential surface of the can; an electrode assembly accommodated in the can; and a cap assembly at a top end of the can and sealing the can. The first region of the can partially covers a top surface of the cap assembly facing an exterior side of the can, the second region of the can surrounds side surfaces of the cap assembly, and the first bent portion is bent such that an angle between the first region and the second region is in a range of about 90° to about 100°.

In an embodiment, the first bent portion may include a notch.

In an embodiment, the second region may include a notch.

In an embodiment, each of the first bent portion and the second region may include a notch.

The can may further include a beading part and a second bent portion on the circumferential surface of the can. The beading part may be inwardly recessed to support a bottom surface of the cap assembly facing an interior side of the can, and the second bent portion may extend between the second region and the beading part and may include a notch.

In an embodiment, the first bent region may include a notch.

In an embodiment, the second region may include a notch.

In an embodiment, each of the first bent portion and the second region may include a notch.

As described above, in a secondary battery according to an embodiment of the present invention, a first bent portion is bent and extends between a first region and a second region such that an angle between the first region and the second region is in a range of about 90° to about 100°, the first region covers (e.g., partially covers) a top surface of the cap assembly, and the second region surrounds side surfaces of the cap assembly so that the first bent portion may unfold to allow the cap assembly to separate from a can before internal gas generated in the can ruptures a circumferential surface of the can, thereby preventing the circumferential surface of the can from rupturing.

In some embodiments of the present invention, the circumferential surface of the can includes a notch to allow the circumferential surface of the can to be easily transformed around the notch, thereby ensuring that the cap assembly can separate from the can.

BRIEF DESCRIPTION OF THE DRAWINGS

The above and other features of the present invention will become more apparent by describing, in detail, exemplary embodiments thereof with reference to the attached drawings in which.

DETAILED DESCRIPTION

Figure 1:
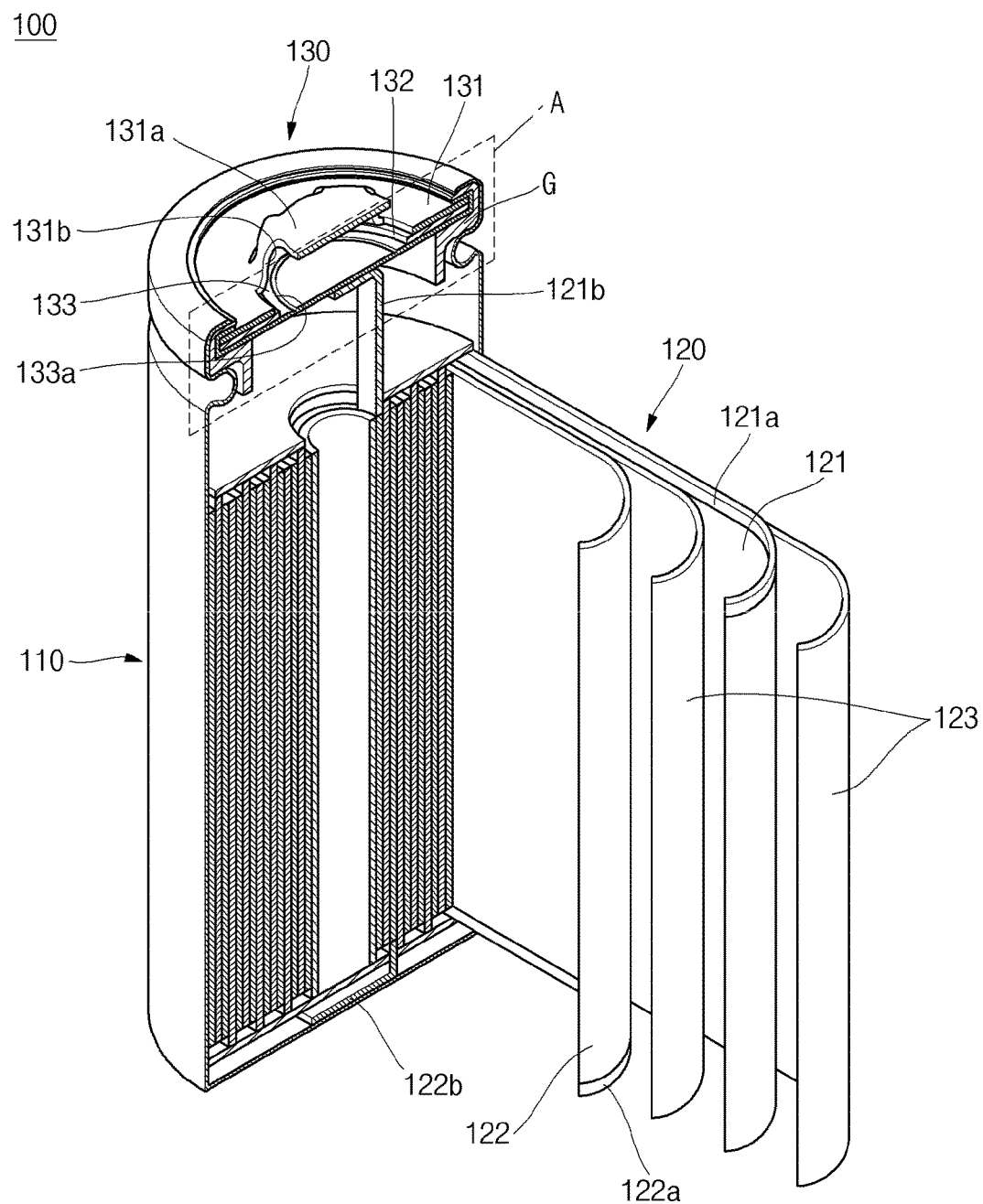
FIG. 1 is a cut-away exploded perspective view of a secondary battery according to an embodiment of the present invention.

Hereinafter, exemplary embodiments of the present invention will be described, in detail, with reference to the accompanying drawings such that they can easily be made and used by those skilled in the art. The present invention may, however, be embodied in many different forms and should not be construed as being limited to the embodiments set forth herein. Rather, these embodiments are provided so that this disclosure will be thorough and complete and will fully convey the concept of the present invention to those skilled in the art. The present invention will be defined by the appended claims and their equivalents.

In the drawings, thicknesses of layers and regions may be exaggerated for clarity. Like numbers refer to like elements throughout. As used herein, the term "and/or" includes any and all combinations of one or more of the associated listed items. In addition, it will be understood that when an element A is referred to as being "coupled to" or "connected to" an element B, the element A can be directly coupled or connected to the element B or an intervening element C may be present between the elements A and B so that the element A can be indirectly coupled or connected to the element B.

In addition, the terminology used herein is for the purpose of describing particular embodiments and is not intended to be limiting thereof. As used herein, the singular forms "a" and "an" are intended to include the plural forms as well, unless the context clearly indicates otherwise. It will be further understood that the terms "comprise" or "include" and/or "comprising" or "including," when used in this specification, specify the presence of stated features, integers, steps, operations, elements, and/or components but do not preclude the presence or addition of one or more other features, integers, steps, operations, elements, components, and/or groups thereof. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

It will be understood that, although the terms first, second, etc. may be used herein to describe various members, elements, regions, layers, and/or sections, these members, elements, regions, layers, and/or sections should not be limited by these terms. These terms are only used to distinguish one member, element, region, layer, and/or section from another. Thus, for example, a first member, a first element, a first region, a first layer, and/or a first section discussed below could be termed a second member, a second element, a second region, a second layer, and/or a second section without departing from the teachings.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

FIG. 1 is a cut-away exploded perspective view of a secondary battery 100 according to an embodiment of the present invention.

Referring to FIG. 1, the secondary battery 100 includes a can 110, an electrode assembly 120, and a cap assembly 130.

The can 110 has a cylinder shape having an open top end. The can 110 is generally made of steel, aluminum, or a combination thereof. However, the can 110 may be made of any suitable material other than the materials listed herein.

The electrode assembly 120 includes a positive electrode plate 121 having a positive electrode active material coated on a positive electrode current collector, a negative electrode plate 122 having a negative electrode active material coated on a negative electrode current collector, and a separator 123 disposed between the positive electrode plate 121 and the negative electrode plate 122 to electrically insulate the positive electrode plate 121 and the negative electrode plate 122 from each other. The electrode assembly 120 is (e.g., the positive electrode plate 121, the negative electrode plate 122, and the separator 123 are) wound in a jelly-roll configuration. A positive electrode uncoated portion 121a that is not coated with the positive electrode active material is formed at an end of the positive electrode current collector, and a positive electrode tab 121b is coupled to the positive electrode uncoated portion 121a. Likewise, a negative electrode uncoated portion 122a that is not coated with the negative electrode active material is formed at an end of the negative electrode current collector, and a negative electrode tab 122b is coupled to the negative electrode uncoated portion 122a. The electrode assembly 120 is accommodated inside the can 110. In some embodiments, the negative electrode tab 122b may be connected to a bottom surface of the can 110. In these embodiments, the bottom surface of the can 110 may serve as a negative electrode terminal.

The cap assembly 130 is disposed at the top end of the can 110 and seals the can 110. The cap assembly 130 includes a cap-up 131, a safety device 132, and a safety vent 133.

A terminal portion 131a upwardly convexly protrudes from the cap-up 131. In addition, an exhaust opening 131b (e.g., an exhaust hole) is formed around the terminal portion 131a. When an over-charge condition or other abnormal operation of the secondary battery 100 occurs, heat and gases may be generated in the can 110. In this case, the exhaust opening 131b may exhaust the gases to the outside.

The safety device 132 may be disposed beneath the cap-up 131. In some embodiments, the safety device 132 is a PTC element having increasing resistance according to a temperature increase. The safety device 132 may prevent current from flowing (or may reduce current flow) between the positive electrode tab 121b of the electrode assembly 120 and the cap-up 131 due to its resistance increasing when the secondary battery 100 is over-heated, thereby preventing the secondary battery 100 from being further over-heated.

The safety vent 133 may be disposed beneath the safety device 132 to be connected to the positive electrode tab 121b of the electrode assembly 120. A rupture groove 133a is formed in the safety vent 133. When the gases press the safety vent 133, the safety vent 133 may be ruptured along the rupture groove 133a. In this case, the gases are exhausted through gaps resulting from the rupture and are eventually released through the exhaust opening 131b in the cap-up 131.

Insulation plates may further be installed between each of the cap-up 131, the safety device 132, and the safety vent 133, and an insulation gasket G may further be coupled to a side surface of the cap assembly 130.

The aforementioned configuration of the safety vent 133 may effectively function to exhaust a relatively small amount of gas. However, in this configuration, it may be difficult to effectively cope with a problem that may be caused when excessive heat and gas are instantaneously generated in the can 110. In this case, the circumferential surface of the can 110 may be pressed by the gas that is not exhausted from the inside to the outside of the can 110, thereby causing the circumferential surface of the can 110 to rupture, which may be referred to as a side-rupture. In a case where a plurality of secondary batteries constitute a module and the circumferential surface of the can 110 of one of the secondary batteries constituting the module ruptures, a can of another secondary battery that is adjacent to the can 110 may also rupture, resulting in successive explosions of the secondary batteries (so-called side-rupture propagation). Therefore, a configuration of the can 110 which can prevent the circumferential surface of the can 110 from rupturing (or which can reduce the occurrence of the circumferential surface of the can 110 rupturing) will be further described below.

Figure 2:
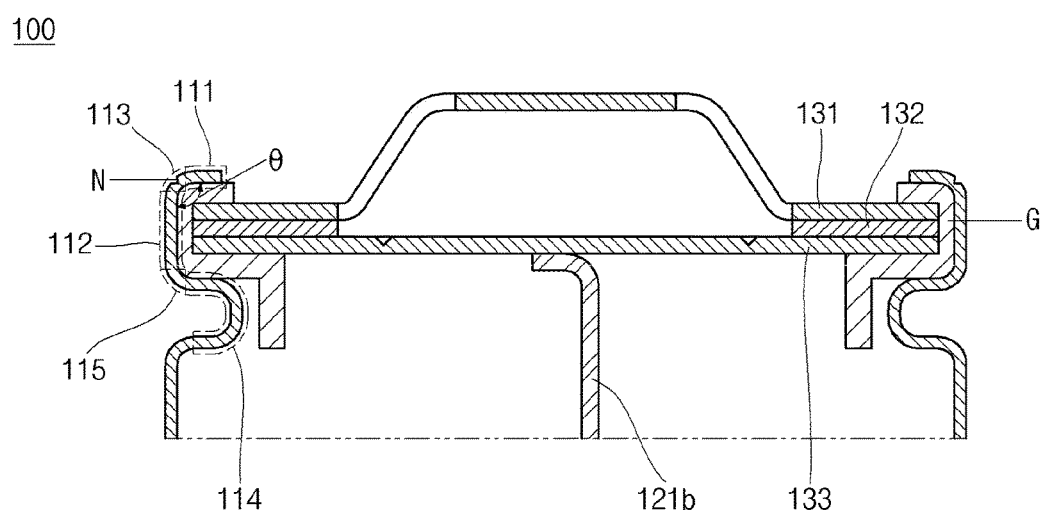
FIG. 2 is a cross-sectional view of the portion 'A' of FIG. 1.

FIG. 2 is a cross-sectional view of the portion 'A' of FIG. 1.

Referring to FIG. 2, a first region 111, a second region 112, a first bent portion 113, a beading portion 114, and a second bent portion 115 are formed on the circumferential surface of the can 110.

The first region 111 covers (e.g., partially covers) a surface of the cap assembly 130 that faces the outside of the can 110, for example, the top surface of the cap assembly 130. The first region 111 may prevent the cap assembly 130 from being arbitrarily separated from the can 110.

The second region 112 surrounds the side surface of the cap assembly 130.

The first bent portion 113 is bent to connect the first region 111 and the second region 112 to each other (e.g., the first bent portion 113 extends between the first region 111 and the second region 112).

The beading portion 114 is a portion of the can 110 that is concavely recessed toward the inside of the can 110 so as to support a surface of the cap assembly 130 that faces the inside of the can 110, for example, the bottom surface of the cap assembly 130, and the second bent portion 115 is bent to connect the second region 112 and the beading portion 114 to each other (e.g., the second bent portion 115 extends between the second region 112 and the beading portion 114).

In some embodiments, the first bent portion 113 may be bent such that an angle (θ) formed between the first region 111 and the second region 112 is in a range of about 90° to about 100°.

Figure 3:
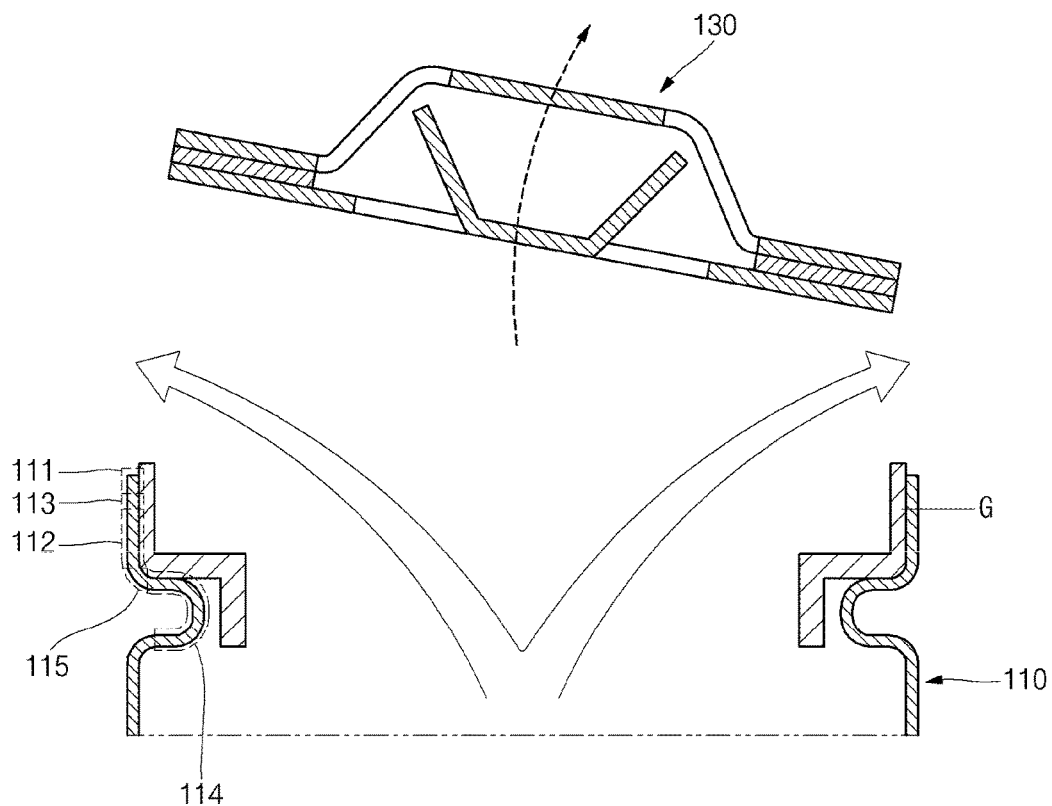
FIG. 3 is a schematic view illustrating a state in which a cap assembly is separated from a can of a secondary battery according to an embodiment of the present invention.

When the first bent portion 113 is bent such that the angle (θ) formed between the first region 111 and the second region 112 is about 90° or greater, the angle (θ) formed between the first region 111 and the second region 112 can be more easily increased (e.g., can be increased with less pressure) than in a conventional case in which a first bent portion is bent such that the angle (θ) formed between a first region and a second region is less than about 90°. For example, the first bent portion 113 can be more easily unfolded by a relatively small force. Thus, a cap assembly 130 can be more easily separated from the can 110 even when a relatively low pressure is applied to the cap assembly 130, as shown in FIG. 3. Therefore, the first bent portion 113 may be unfolded so as to allow the cap assembly 130 to separate from the can 110 before the internal gas ruptures the circumferential surface of the can 110, and the gas may be smoothly exhausted through the top end of the can 110, thereby preventing the circumferential surface of the can 110 from rupturing or reducing the chance of the circumferential surface of the can 110 rupturing.

When the first bent portion 113 is bent such that the angle (θ) formed between the first region 111 and the second region 112 is about 100° or less, the cap assembly 130 may not be arbitrarily separated from or move away from the can 110.

In addition, a notch N may be formed in the first bent portion 113.

Because the first bent portion 113 is more easily unfolded around the notch N, it is possible to ensure that the first bent portion 113 is unfolded (e.g., it is possible to reduce the pressure or force necessary to unfold the first bent portion 113) so that the cap assembly 130 can separate from the can 110 before the gas ruptures the circumferential surface of the can 110.

The notch N may include a plurality of notches formed along (e.g., successively arranged along) the circumference of the can 110. Alternatively, the notch N may include a plurality of notches formed along a length of the can 110.

Figure 4:
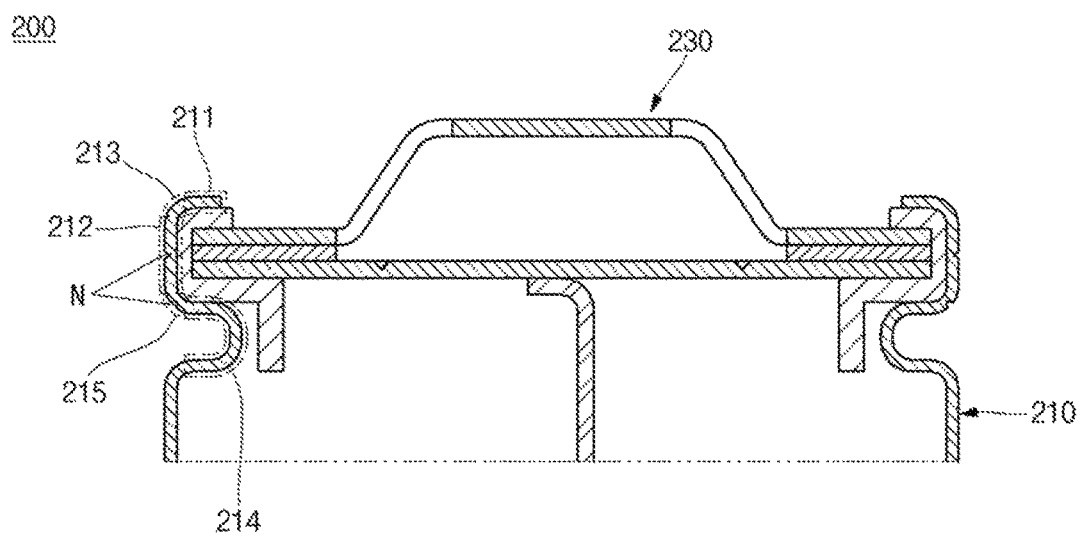
FIG. 4 is a partial cross-sectional view of a secondary battery according to another embodiment of the present invention.

FIG. 4 is a partial cross-sectional view of a secondary battery 200 according to another embodiment of the present invention. Functional elements shown in FIG. 4 are substantially the same as corresponding functional elements shown in FIG. 2.

Referring to FIG. 4, the secondary battery 200, according to another embodiment of the present invention, has a first region 211, a second region 212, a first bent portion 213, a beading portion 214, and a second bent portion 215 formed on the circumferential surface of a can 210. The secondary battery 200 is different from the secondary battery 100 according to the previously-described embodiment of the present invention in that a notch N is formed in the second region 212 and/or in the second bent portion 215.

In the secondary battery 200 according to another embodiment of the present invention, the second region 212 and/or the second bent portion 215 may be easily bent around the notch N so as to face the outside of the can 210. Therefore, because a configuration in which a cap assembly 230 is allowed to separate from the can 210 is more easily provided or secured, it is possible to ensure that the cap assembly 230 can separate from the can 210 before the internal gas ruptures the circumferential surface of the can 210.

While secondary batteries according to exemplary embodiments of the present invention have been particularly shown and described, it will be understood by those of ordinary skill in the art that various changes in form and details may be made therein without departing from the spirit and scope of the present invention as defined by the following claims and their equivalents.

What is claimed is:

1. A secondary battery comprising:
a cylindrical can having a length in a direction from a top end of the can to a bottom end of the can, the can comprising a first region at the top end of the can, a second region below the first region in the length direction of the can, and a first bent portion extending between the first region and the second region on a circumferential surface of the can, the first bent portion being bent such that an angle between the first region and the second region is in a range of about 90° to about 100°;
an electrode assembly accommodated in the can; and
a cap assembly at the top end of the can and sealing the can, the first region of the can partially covering a top surface of the cap assembly facing an exterior side of the can, the second region of the can surrounding side surfaces of the cap assembly, wherein the first bent portion and/or the second region comprises a notch.

2. The secondary battery of claim 1, wherein the first bent portion comprises the notch.

3. The secondary battery of claim 1, wherein the second region comprises the notch.

4. The secondary battery of claim 1, wherein the first bent portion comprises the notch, and the second region comprises another notch.

5. The secondary battery of claim 1, wherein the can further comprises a beading part and a second bent portion on the circumferential surface of the can, the beading part and the second bent portion being below the second region in the length direction of the can, the beading part being inwardly recessed to support a bottom surface of the cap assembly facing an interior side of the can, the second bent portion extending between the second region and the beading part and comprising a second notch.

6. The secondary battery of claim 5, wherein the first bent portion comprises the notch.

7. The secondary battery of claim 5, wherein the second region comprises the notch.

8. The secondary battery of claim 5, wherein the first bent portion comprises the notch, and the second region comprises a third notch.

* * * * *